(12) United States Patent
Hirasaka et al.

(10) Patent No.: US 6,690,540 B2
(45) Date of Patent: Feb. 10, 2004

(54) DISK DRIVE DAMPER HAVING A THIN PORTION AND A PLURALITY OF THICK PORTIONS

(75) Inventors: Yoshihiro Hirasaka, Sagamihara (JP); Kohji Serizawa, Yokohama (JP); Shinichi Matsuzaki, Fujisawa (JP); Kohji Takahashi, Yamato (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 212 days.

(21) Appl. No.: 09/956,178

(22) Filed: Sep. 19, 2001

(65) Prior Publication Data

US 2002/0044374 A1 Apr. 18, 2002

(30) Foreign Application Priority Data

Oct. 13, 2000 (JP) ........................................ 2000-313251

(51) Int. Cl.⁷ ............................................. G11B 33/08
(52) U.S. Cl. ................................................. 360/97.02
(58) Field of Search ........................... 360/97.01, 97.02, 360/97.03, 98.01

(56) References Cited

U.S. PATENT DOCUMENTS

| | | | | |
|---|---|---|---|---|
| 5,703,734 A | * | 12/1997 | Berberich et al. | 360/97.02 |
| 5,777,821 A | * | 7/1998 | Pottebaum | 360/97.02 |
| 5,781,373 A | * | 7/1998 | Larson et al. | 360/97.02 |
| 6,078,498 A | * | 6/2000 | Eckerd et al. | 361/685 |
| 6,108,163 A | * | 8/2000 | Boutaghou | 360/97.02 |
| 6,185,807 B1 | * | 2/2001 | Kazmierczak et al. | 29/450 |
| 6,529,345 B1 | * | 3/2003 | Butler et al. | 360/97.01 |

* cited by examiner

*Primary Examiner*—Jefferson Evans
(74) *Attorney, Agent, or Firm*—Robert B. Martin; Bracewell & Patterson, L.L.P.

(57) ABSTRACT

A disk drive damper avoids matching a frequency band of a sound frequency peak generated by the rotation of a spindle motor and a resonant frequency of the damper. The damper is attached to a disk drive apparatus and enabled to repress vibration. The damper includes a flat base portion and wall-thickness portions that are thicker than the flat base portion. The damper is varied in shape more freely than conventional flat dampers. Consequently, the resonant frequency of the damper can be adjusted more freely than ever.

11 Claims, 9 Drawing Sheets

|  | RESONANT FREQUENCY |
|---|---|
| PRIMARY VIBRATION MODE | 516.8 Hz |
| SECONDARY VIBRATION MODE | 682.5 Hz |
| TERTIARY VIBRATION MODE | 1627.7 Hz |

[Figure 9]

PRIOR ART

[Figure 10]

PRIOR ART

DISK DRIVE DAMPER HAVING A THIN PORTION AND A PLURALITY OF THICK PORTIONS

BACKGROUND OF THE INVENTION

1. Field of the Invention

The present invention relates to a disk drive apparatus, which is typically a hard disk drive.

2. Background Art

A hard disk drive (hereinafter, to be referred to as the HDD), which is the most popular storage means for computer data, is structured so that a single or a plurality of magnetic disks are disposed on one and the same axis and driven rotationally by a spindle motor therein. A head provided so as to face each magnetic disk reads/writes data from/on the disk. The head is driven by an actuator, usually by a voice coil motor (hereinafter, to be described as the VCM). The magnetic disk, the head, and the actuator are all housed in housing referred to as a disk enclosure. The disk enclosure is configured by a thin-box-like base made of an aluminum alloy and a top cover used to seal the opening of the base. Improvement of the storage capacity per magnetic disk and improvement of the speed for reading/writing data from/on the magnetic disk have been main technical issues for improvement of the HDD.

The latter issue, that is, improvement of the speed for reading/writing data, can be achieved by reducing the seek time of the head that moves to a target track on the subject disk. This seek time can also be improved by improving the performance of the VCM, since the VCM drives the head as described above. And, in order to improve the performance of the VCM, it is only required to make the magnetic power of the permanent magnet of the VCM more stronger or increase the thickness of the permanent magnet, thereby increasing the magnetic field to be applied to the voice coil. The improvement of the magnetic power of the permanent magnet, however, has already reached its technical limit. In addition, the thickness of the permanent magnet cannot be increased any longer in such the HDD whose compaction is demanded more and more.

Furthermore, the speed for reading/writing data can also be improved by speeding up the rotation of the magnetic disk. As the rotation of the magnetic disk is speeded up such way, however, a problem arises from the sound or vibration properties of the subject HDD.

3. Problems to be Solved by the Invention

Figure 9:
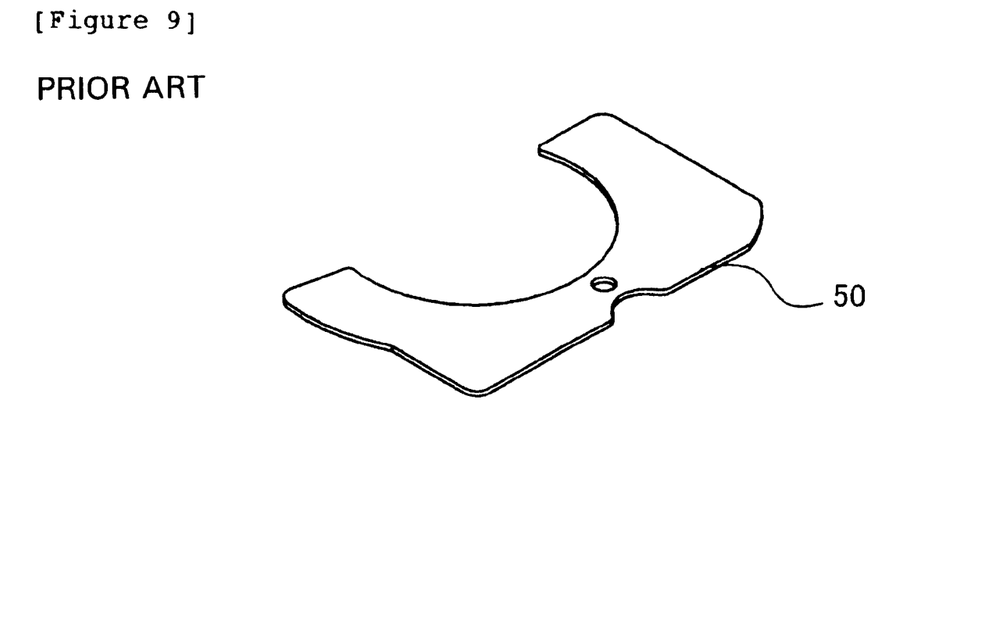
FIG. 9 is a perspective view of a damper employed for a conventional HDD.
Figure 10:
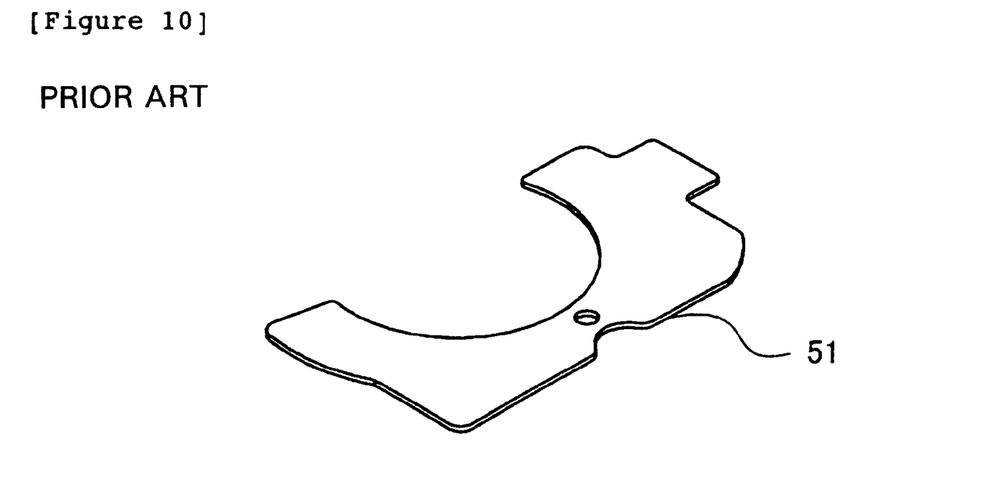
FIG. 10 is a perspective view of another damper employed for a conventional HDD.

Conventionally, a damper has been stuck on the subject HDD so as to repress the HDD vibration. The damper is made of, for example, stainless steel. FIG. 9 shows an example of such a damper having been used conventionally. The damper 50 shown in FIG. 9 is formed by punching a flat plate into a predetermined shape. In this case, therefore, the HDD design parameters to be changed freely are the external dimension and the thickness of the HDD. And, the external dimension is limited by the size of the HDD. For example, the external dimension is just permitted to have such an additional portion as the damper 51 shown in FIG. 10 at part thereof. An increase of the wall thickness of the HDD might also cause the life of the punching mold for punching the damper to be reduced and such an increase of the wall-thickness is limited by the size of the HDD.

The conventional HDD includes two problems to arise from sound or vibration.

One is existence of a sound frequency peak to be generated by the rotation of the spindle motor for driving the HDD. Although a damper is formed so as to reduce this sound frequency, the sound frequency is often amplified when the resonant frequency of the damper matches with the HDD sound frequency band in which a sound frequency peak is generated by the rotation of the spindle motor (hereinafter, to be referred to as an HDD sound peak frequency band). Especially, as the rotation speed of the spindle motor is increased, this sound frequency amplification becomes remarkable. In order to avoid this problem, therefore, much care must be taken for shifting the resonant frequency of the damper from the HDD sound peak frequency band when the damper 50 or 51 is formed in the HDD whose rotation speed is fast, concretely over 10,000 rpm. In spite of this, such the consideration for the damper 50 or 51 is also limited due to the HDD design.

The above HDD vibration problem occurs as a reaction to the seek operation of the actuator. This vibration is referred to as a rotational vibration (R.V.). In order to improve the HDD properties to reduce the R.V., therefore, a well-known method has been proposed so as to increase the mass of the damper 50/51. In case the mass of the damper 50/51 is increased, however, the damper must also be increased in thickness or a plurality of dampers must be bonded together. The conventional method has not taken such the measure enough due to the limitation by the HDD design as described above.

There is also a well-known method for disposing a member that increases the mass at an outer periphery area of the HDD so as to increase the moment, which functions as a resistance to the above R.V. And, an attempt has been made to fix the member (mass) by screws at an outer periphery area of the HDD. In case the member (mass) is fixed by screws such way, an additional work must be added to the manufacturing process, thereby the manufacturing cost is increased. Under such circumstances, it is an object of the present invention to provide a damper that solves the above conventional problems, thereby providing a disk drive apparatus excellent in sound or vibration properties.

SUMMARY OF THE INVENTION

The inventor of the present invention has examined a method for increasing the wall thickness of a damper partially while examination has been done conventionally so as to change the shape of the damper whose wall thickness is premised to be fixed. As a result, the inventor has found that it is easy to shift the resonant frequency of the damper from the HDD sound peak frequency band. In other words, it is easy to avoid the matching between the resonant frequency of the damper and the HDD sound peak frequency band in case the wall thickness of the damper is increased partially. On the contrary, the inventor has also found that it is not easy to shift the resonant frequency of the damper from the peak band even when the wall thickness of the damper is increased in case the damper is fixed in thickness.

The present invention is based on such the knowledge and the damper of the present invention is attached to the subject disk drive apparatus and enabled to repress the HDD vibration. The damper comprises a flat portion having a jointing surface onto the disk drive apparatus and a wall-thickness portion that is thicker than the flat portion. The damper of the present invention has a three-dimensional shape while the conventional flat damper whose thickness is in uniform has a two-dimensional shape. Consequently, the damper can be varied more freely in shape, thereby it is possible to adjust the resonant frequency of the damper more freely. It is thus possible to shift the resonant frequency of the damper from the HDD sound peak frequency band more easily.

Basically, the damper of the present invention enables the wall-thickness portion to be formed at any position thereon. Preferably, however, it should be formed at an outer periphery area of the flat portion. For example, in case the damper of the present invention is to be attached to an HDD, a space for housing the wall-thickness portion will have to be provided on the housing of the HDD. This is because it would be easy to secure such a space at an outer periphery area of the HDD housing. As for the R.V. problem, the wall-thickness portion should preferably be formed at such an outer periphery area. And, when the mass is the same, disposing the wall-thickness portion at such an periphery area makes it possible to get a larger moment, which is effective for reducing the R.V.

The damper of the present invention also enables the wall-thickness portion as described above to be formed at a plurality of places thereon. This is because there is a case preferred to shift the resonant frequency of the damper from the HDD sound peak frequency band. This method is also effective when it is difficult to form a wall-thickness portion that can satisfy the thickness requirement by itself.

While the damper of the present invention is characterized by a wall-thickness portion formed thereon as described above, this wall-thickness portion means a portion of the damper where the mass is increased locally. Therefore, the present invention can also provide a flat damper attached to a disk drive apparatus and enabled to repress the vibration of the apparatus. The damper may also include a flat portion having a jointing portion onto the disk drive apparatus; a mass-increased portion disposed at an outer periphery area of the flat portion and having larger mass per unit area than the flat portion.

The damper of the present invention disposes its mass-increased portion at an outer periphery area of the flat portion. This mass-increased portion makes it easy to shift the damper resonant frequency from the HDD sound frequency peak band. And, because the mass-increased portion is disposed at an outer periphery area of the flat portion, the damper can be attached to the target HDD in a preferred form as described above. And, because the mass-increased portion is disposed at an outer periphery area of the flat portion, the damper can reduce the R.V. significantly. Concretely, the damper of the present invention can obtain two types of effects; the damper resonant frequency can be easily shifted from the HDD sound peak frequency band and the properties of the damper effective to reduce the R.V. can be improved.

In case it is premised that dampers are made of the same material, the mass-increased portion can be formed only by increasing that portion on the damper of the present invention. In case dampers are to be made of two or more materials, however, the mass-increased portion can be formed by disposing a material whose specific gravity is larger than other portions at an outer periphery area of the damper. In this case, it is possible to uniform the wall thickness of the damper.

The present invention also provides a disk drive apparatus to which the above-described damper is attached. Concretely, the disk drive apparatus of the present invention comprises a disk-like medium driven rotationally around a rotation axis and enabled to store data thereon; an actuator having a head for reading/writing data from/on the disk-like medium and being rotated around the rotation axis; housing for housing the disk-like medium and the actuator; and a damper formed at an outer surface of the housing and having a plurality of thick portions.

The disk drive apparatus of the present invention can shift the damper resonant frequency from the HDD sound peak frequency band easily, since the damper has a plurality of portions, each of which differs in thickness from others.

In the disk drive apparatus of the present invention, the damper should preferably be configured by a wall-thickness portion formed at an outer periphery area thereof and a flat portion except for the wall-thickness portion as described above.

Furthermore, in the disk drive apparatus of the present invention, the damper should preferably be formed so that the flat portion is stuck on the housing and the wall-thickness portion is not in contact with the housing. And, the means for attaching the damper to the housing may be mechanical jointing means, which is screws. However, in case the housing and the damper are configured with materials whose linear expansion coefficients are different from each other, the housing might be deformed due to a temperature stress caused by such the difference between those linear expansion coefficients. On the contrary, in case an adhesive agent or double-coated tape is used to stick the damper on the housing, it is expected that the adhesive agent or double-coated tape can function as a cushion member for absorbing such the temperature stress. Consequently, the sticking method is favorable as the jointing method. In this case, because the double-coated tape uses an adhesive agent, the sticking by such the double-coated tape may be considered to be sticking by an adhesive agent in the broad sense. And, separating the wall-thickness portion from the housing is to enable the wall-thickness portion to vibrate and make the vibration repress the vibration of the HDD enough. Employment of such vibration repressing structure employed for a disk drive apparatus is a novelty achieved by the present invention.

Furthermore, the wall-thickness portion in the disk drive apparatus of the present invention should preferably be formed at a plurality of places in the circumferential direction of the rotation axis of the actuator. In case the wall-thickness portion is assumed as the mass for repressing the R.V., the mass should be distributed at a plurality of places rather than it is concentrated at a place. And, because the R.V. is generated by a seek operation, that is, the rotation of the actuator, such a plurality of the wall-thickness portions formed in the circumferential direction of the rotation axis function effectively as resistance to the R.V.

The present invention also provides a disk drive apparatus comprising a disk-like medium driven rotationally around a rotation axis and enabled to store data thereon; an actuator having a head for reading/writing data from/on the disk-like medium and being driven around the rotation axis; housing for housing the disk-like medium and the actuator; and a damper formed at an outer surface of the housing so as to increase the mass more and more gradually towards the outer periphery area.

This disk drive apparatus, because it has a damper whose mass is increased more and more gradually towards the periphery area such way, can shift the damper resonance frequency from the HDD sound peak frequency band easily. And, because the mass is increased more and more gradually towards the outer periphery area, the properties of the disk drive apparatus are improved effectively so as to reduce the R.V.

The disk drive apparatus of the present invention can apply to an HDD. Consequently, the present invention can also provide a hard disk drive comprising a disk-like medium for storing data magnetically; a spindle motor for driving the disk-like medium rotationally; a rotary actuator having a magnetic head for writing/reading data on/from the disk-like medium and being enabled to seek the head to the disk-like medium and rotated around a pivot; a disk enclosure for housing the disk-like medium, the spindle motor, and the rotary actuator and being configured by a box-like base having an opening and a cover used to seal the opening; and a damper having a wall-thickness portion disposed at the bottom of the base and formed so as to become more thicker and thicker gradually towards the outer periphery area.

The hard disk drive of the present invention disables the damper to have a resonant frequency in the HDD sound peak frequency band to be generated by the rotation of the spindle motor. Consequently, the sound properties are not degraded even in a hard disk drive that has one or more disks driven fast.

The base in the hard disk drive of the present invention forms a housing space for housing the wall-thickness portion of the damper at an outer periphery portion where the disk-like medium does not exist and the wall-thickness portion of the damper can be housed in the housing space so as to vibrate. And, because the wall-thickness portion of the damper is never exposed to the outside of the hard disk drive and enabled to vibrate such way, the damper can repress the vibration of the hard disk drive with its vibration. In this case, in order to enable the wall-thickness portion to vibrate, it is just required to hold the wall-thickness portion in the housing space with a predetermined gap from the base.

The damper in the hard disk drive of the present invention should preferably be formed with a material whose specific gravity is larger than that of the material of the base. This is to make the damper repress the vibration of the hard disk drive more effectively.

When the wall-thickness portion of the damper is housed in the housing space so as to be enabled to vibrate there as described above, the wall-thickness portion functions as a so-called mass damper, thereby it can reduce the R.V. effectively. Consequently, the present invention comes to provide a hard disk drive comprising a disk-like medium for storing data magnetically; a spindle motor for driving the disk-like medium rotationally; a rotary actuator having a head for storing/reproducing data on/from the disk-like medium, seeking the head to the disk-like medium, and being rotated around a pivot; a disk enclosure for housing the disk-like medium, the spindle motor; and the rotary actuator, and being configured by a box-like base having an opening and a cover used to seal the opening; and a mass damper disposed with a predetermined gap from the base.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE INVENTION

Figure 1:
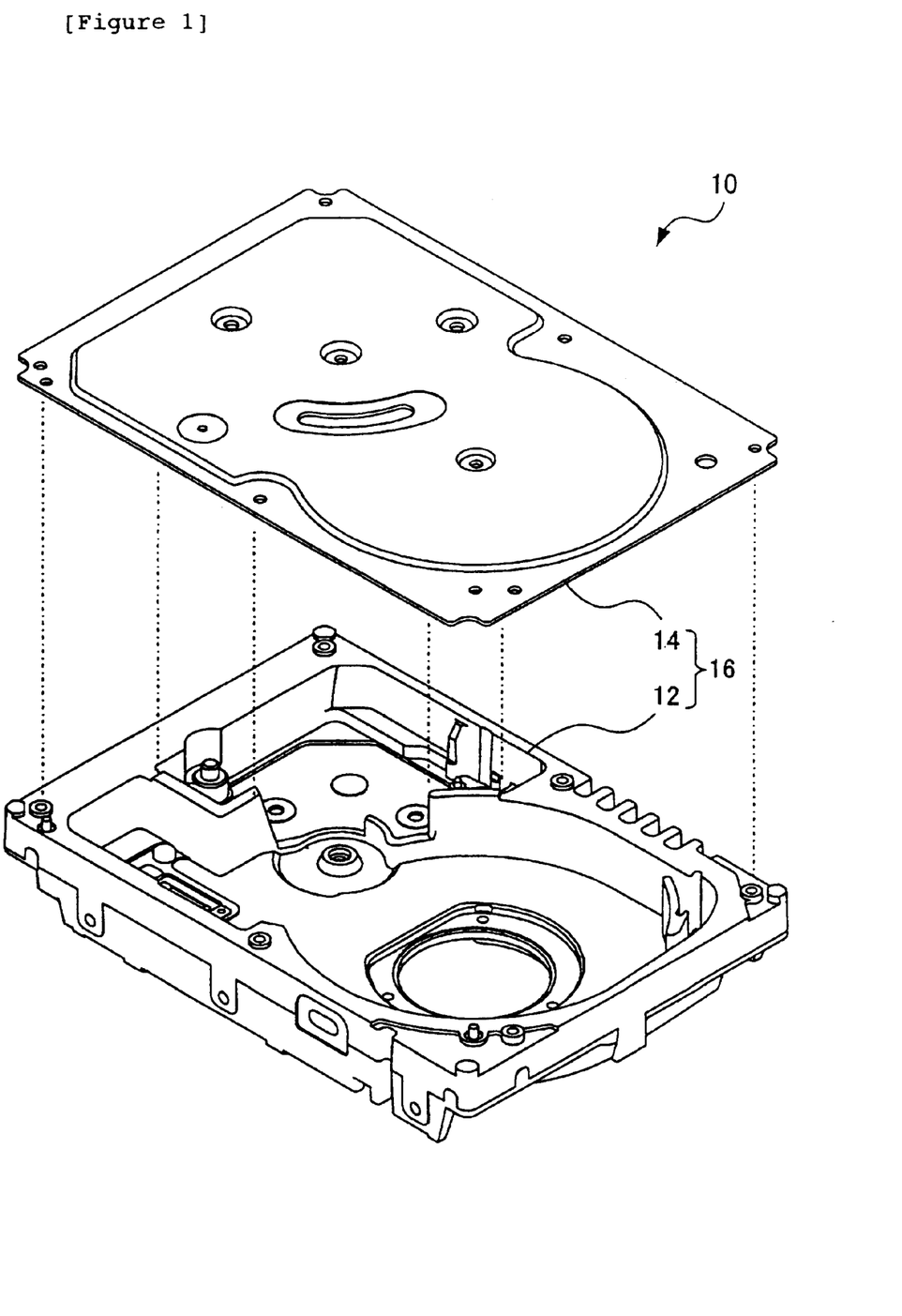
FIG. 1 is an exploded isometric view of a disk drive enclosure for a hard disk drive (HDD) constructed in accordance with the present invention.

Hereunder, the preferred embodiment of the present invention will be described with reference to the accompanying drawings. In this embodiment, the disk drive apparatus of the present invention applies to a hard disk drive (HDD) 10. As shown in FIG. 1, the HDD 10 configures the disk enclosure 16 by sealing the opening of the box-like base 12 formed with an aluminum alloy with a cover 14. The disk enclosure 16 has a form factor of 3.5-inch in size. The cover 14 is fixed to the base 12 by screws with a rectangular-shaped sealing member (not illustrated) therebetween, so the disk enclosure 16 is structured air-tightly.

Figure 2:
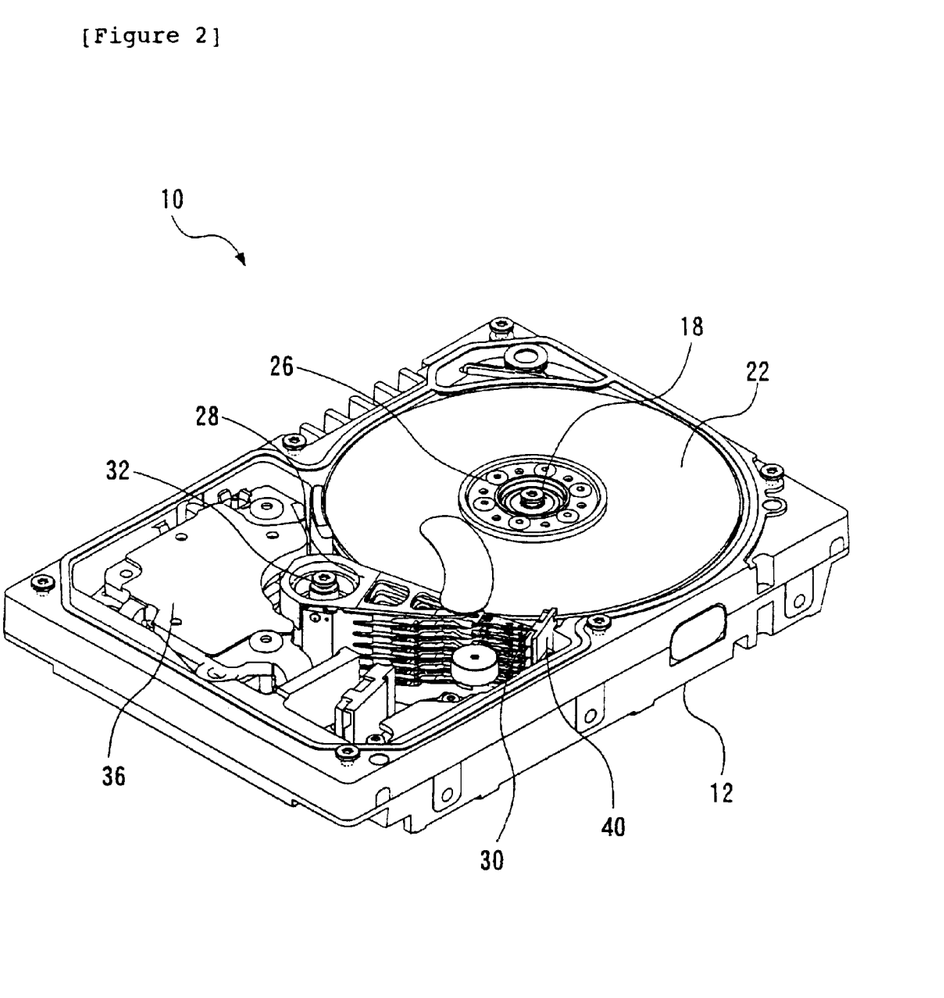
FIG. 2 is an isometric view of the HDD mounted in the enclosure of FIG. 1.

In this disk enclosure 16 is provided a hub-in structured spindle motor 18, which is located almost in the center of the base 12 as shown in FIG. 2. On the top surface of the hub (not illustrated) of this spindle motor 18, a magnetic disk 22 made of glass or an Al substrate respectively are stacked on and fixed to the same axis by a top clamp 26 via a spacer (not illustrated) respectively. The outside diameter of each disk 22 is 84 mm and the rated rotation speed of the spindle motor 18 is 10,000 rpm.

In the disk enclosure 16 is housed the actuator 28. This actuator 28 has a head 30 at one end. The head 30 read/writes data from/on the magnetic disk 22. The intermediate portion of the actuator 28 is supported on the base via a pivot 32 so as to be rotated freely around the pivot 32. A VCM (voice coil motor) coil is located at the other end of the actuator 28. The actuator 28 is rotated by the VCM 36 provided in the disk enclosure 16 so as to cooperate with the VCM coil.

On the outer surface (bottom surface) of the base 12 is attached a card (not illustrated) used as a circuit board. This card is rectangular in shape and enough in size to cover a half of the outer surface of the base 12. An electric power as well as signals, etc. for driving the spindle motor are input/output between the card and the spindle motor 18. And, a VCM coil motive power, as well as an electric power and signals for driving the head 30 are input/output between the card and the actuator 28. Such the input/output operations between the card and the actuator 28 are done via a flexible cable (FPC).

The HDD 10 in this embodiment is a head loading/unloading type one. This head loading/unloading type HDD makes the lamp block 40 hold the actuator 28 during a non-operation time, thereby the head 30 is unloaded to the refuge position while it is not in contact with the surface of the disk 22. The head is driven by the actuator 28 during an operation so as to be sought on the disk 22.

Figure 3:
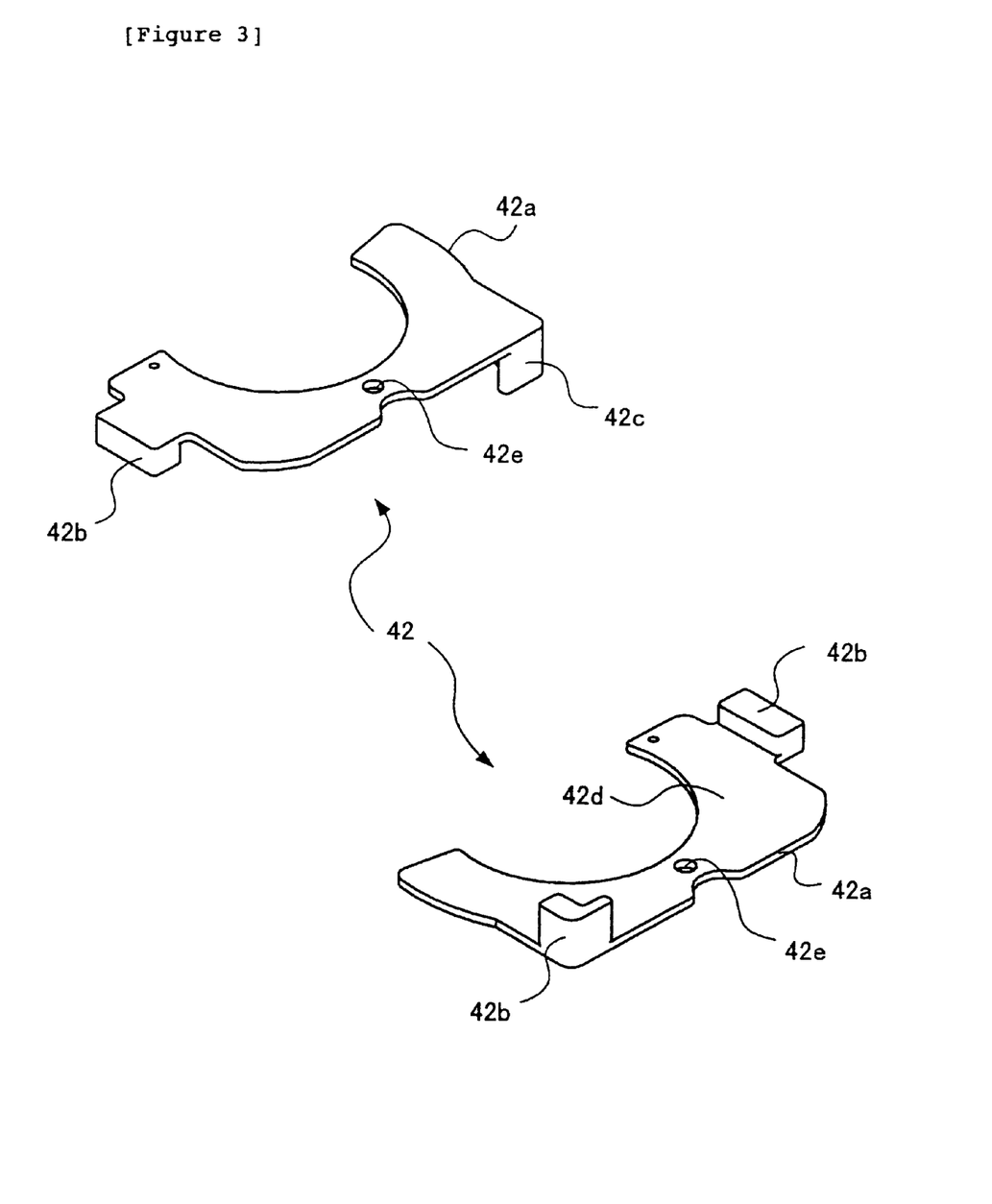
FIG. 3 is an isometric view of a damper for the HDD and is constructed in accordance with the present invention.

FIG. 3 shows the damper 42 attached to the HDD 10. This damper 42 is configured by a flat substrate 42a having an arc notch as shown in FIG. 3; and wall-thickness portions 42b and 42c disposed at outer periphery areas of the substrate 42a and formed thicker than the substrate 42a. Consequently, this damper 42 has a plurality of portions, each of which differs in thickness from others. The damper 42 also has a mass-increased portion whose mass per unit area is increased more and more gradually towards the outer periphery areas. One surface of the substrate 42a is used as a jointing surface 42d onto the base 12. The substrate 42a also has a through-hole 42e in the center of the width direction. This through-hole 42e is formed so as to reduce the rigidity of the damper 42.

The damper 42 should preferably be made of such a metallic material as CU, Zn, stainless steel, or the like. Because Cu, Zn, and stainless steel have a specific gravity larger than that of the aluminum alloy of the base 12 respectively, each of the materials is favorable for the damper 42. In case a metallic material is used to form the damper 42, the damper 42 will be manufactured easily in well-known casting, forging, and other processes. In the casting and forging processes, the damper 42 can be manufactured as a single member. It is also possible to manufacture the substrate 42a, as well as the wall-thickness portions 42b and 42c separately, then they are united into one in the caulking, welding, contact-bonding, and other processes. The present invention just requires that the damper 42 is formed as a single member in the final process; the damper 42 may still be divided in other manufacturing processes. The wall-thickness portions 42b and 42c may be formed with a material whose specific gravity is larger than that of the substrate 42a. Instead of the wall-thickness portions 42b and 42c, members formed with a material whose specific gravity is larger than that of the substrate 42a may be disposed at outer periphery areas of the substrate 42a. In this case, the members can have the same thickness as that of the substrate 42a.

Figure 4:
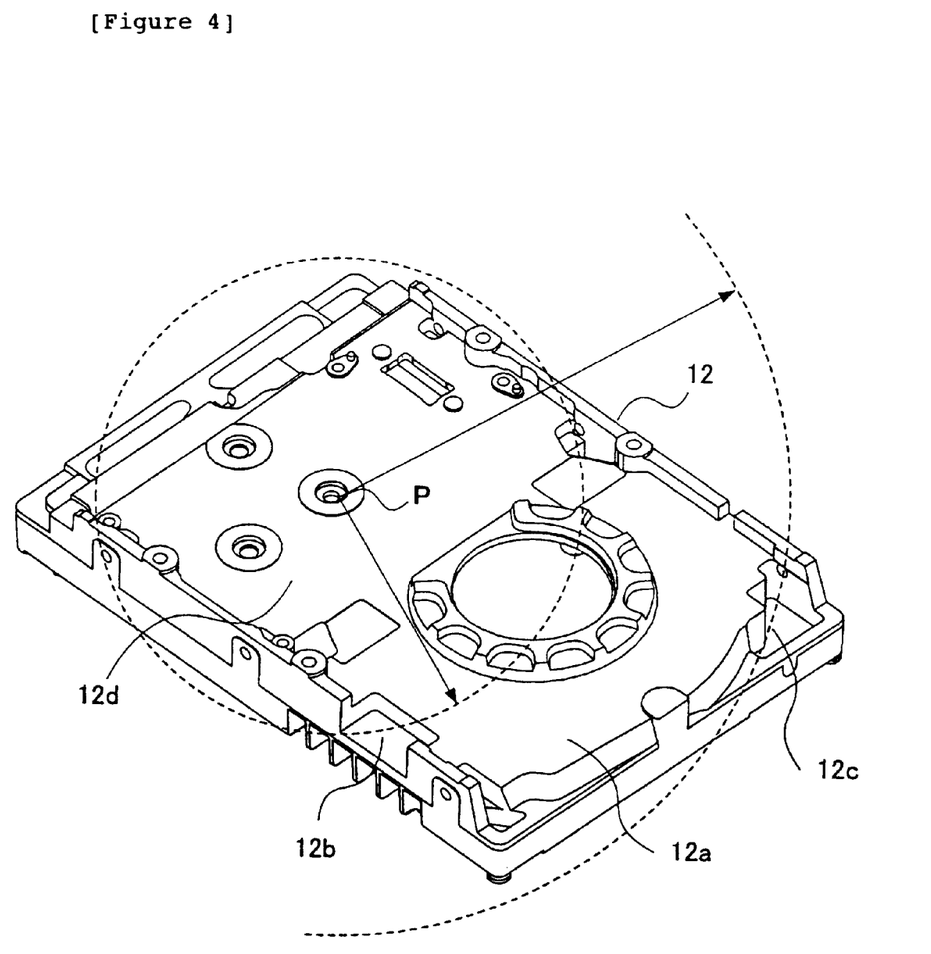
FIG. 4 is a perspective view of a rear side of a base used for the HDD in the embodiment of the present invention.

FIG. 4 is a perspective view of the back side of the base 12 of the HDD 10. At the back side of the base 12 are disposed the damper 42 (FIG. 6) and the above-described card. The damper 42 is disposed on a damper disposing surface 12a in the lower half of the base 12 and the card is disposed on the card disposing surface 12d in the upper half of the base 12 as shown in FIG. 4 respectively. At the periphery of the damper disposing surface 12a of the base 12 are formed recessed portions 12b and 12c used to fit the wall-thickness portions 42b and 42c of the damper 41 The wall-thickness portion 42b is fit in the recessed portion 12b and the wall-thickness portion 42c is fit in the recessed portion 12e. The recessed portions 12b and 12c are enough in size to form a predetermined gap between each of the wall-thickness portions 42b and 42c and the base 12. Because the pivot 32 is disposed at a position denoted by P in FIG. 4, the wall-thickness portions 42b and 42c come to be formed in the circumferential direction of a circle around the rotation axis of the actuator 28. In this case, the circle may be plural or single as shown with dotted lines in FIG. 4.

One of the reasons why the recessed portions 12b and 12c can be formed at the base 12 is to use a magnetic disk 22 whose outside diameter is smaller than the original outside diameter with respect to the form factor of the disk enclosure 16. Concretely, the HDD 10 sets 10,000 rpm as the rated rotation speed of the spindle motor 18 so as to improve the speed of the head 30 for reading/writing data. The 10,000 rpm is faster than the rotation speed of the spindle motor employed for the 5-inch HDD 10 from the first. And, because such a fast rotation speed increases the power consumption of the HDD 10, the diameter of the magnetic disk 22 is reduced so as to suppress the increase of the power consumption of the HDD 10. In this embodiment, the magnetic disk 22 is 84 mm in outside diameter, which is reduced considerably from the 95 mm outside diameter corresponding to the 3.5-inch form factor. Because the magnetic disk 22 is reduced in outside diameter such way, spaces can be formed at the disk enclosure 16, which is a 3.5-inch form factor, more concretely at the base 12 enough to form the recessed portions 12b and 12c.

Figure 5:
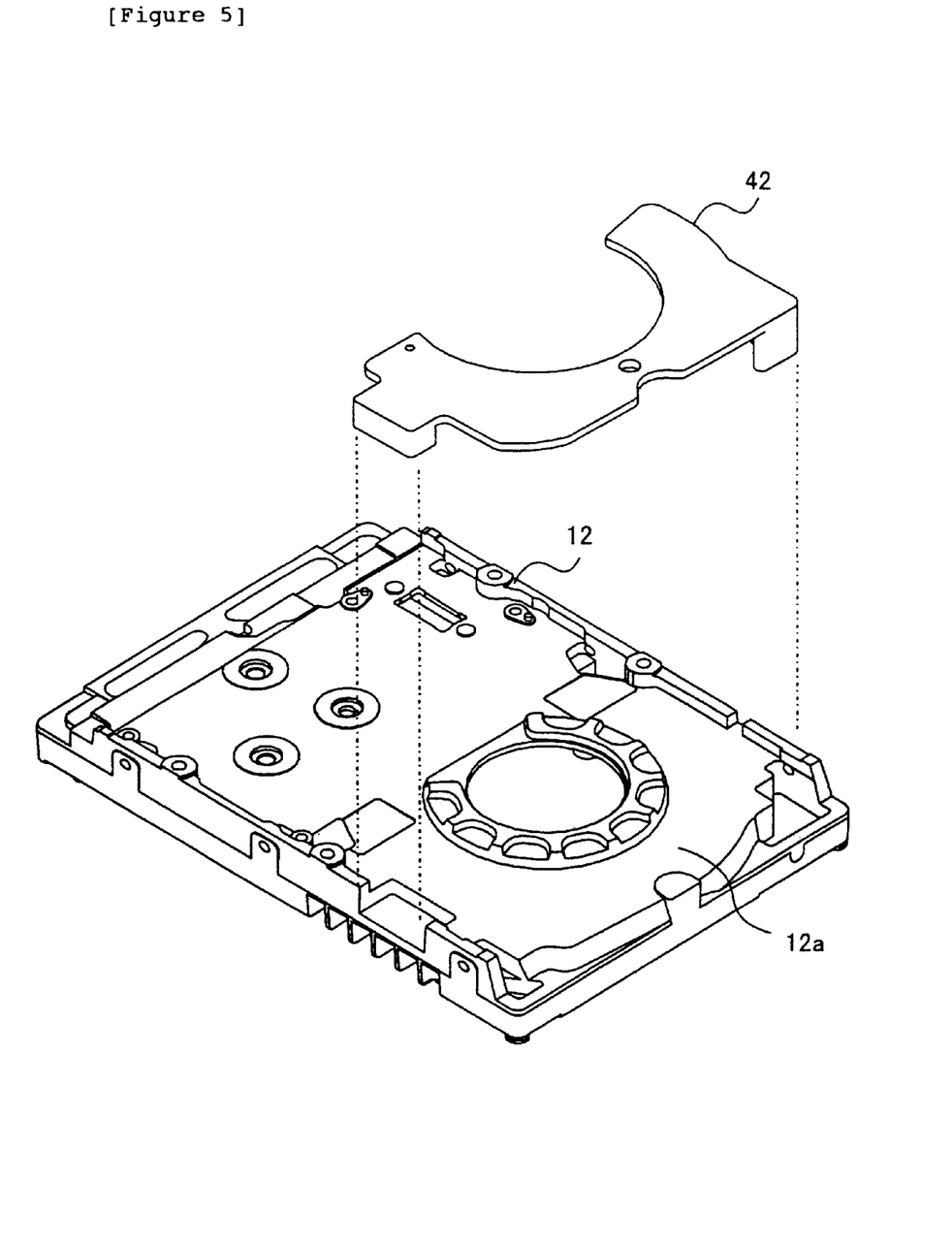
FIG. 5 is a perspective view of the damper of FIG. 3 prior to attachment to the base in the embodiment of the present invention.

When the damper 42 is disposed on the base 12, the damper 42 is put on the damper disposing surface 12a of the base 12 as shown in FIG. 5. In case the damper 42 is stuck on the base 12 with, for example, double-coated tape, the tape is stuck first on the damper disposing surface 12a of the base 12. Then, the damper 42 is put on the tape, thereby the damper 42 can be stuck on the base 12. The double-coated tape used as jointing means is just an example; the present invention is not limited only to such the tape. For example, an adhesive agent or such mechanical jointing means as screws may be used. In case the base 12 and the damper 42 are made of different materials, however, the stuck portion between the base 12 and the damper 42 might cause a strain due to the difference of the linear expansion between those materials. While the mechanical jointing means as screws, etc. cannot prevent such the strain, both double-coated tape and adhesive agent can work as cushion members that absorb such the strain caused by a difference of the linear expansion between two materials. Those members are thus favorable as the jointing means. And, although the damper 42 has wall-thickness portions 42b and 42c, it can be fixed to the base 12 just by fixing the flat substrate 42a to the base 12. Concretely, there is no need to add any new process to the assembly work of the HDD 10. The damper 42 has such an advantage.

Figure 6:
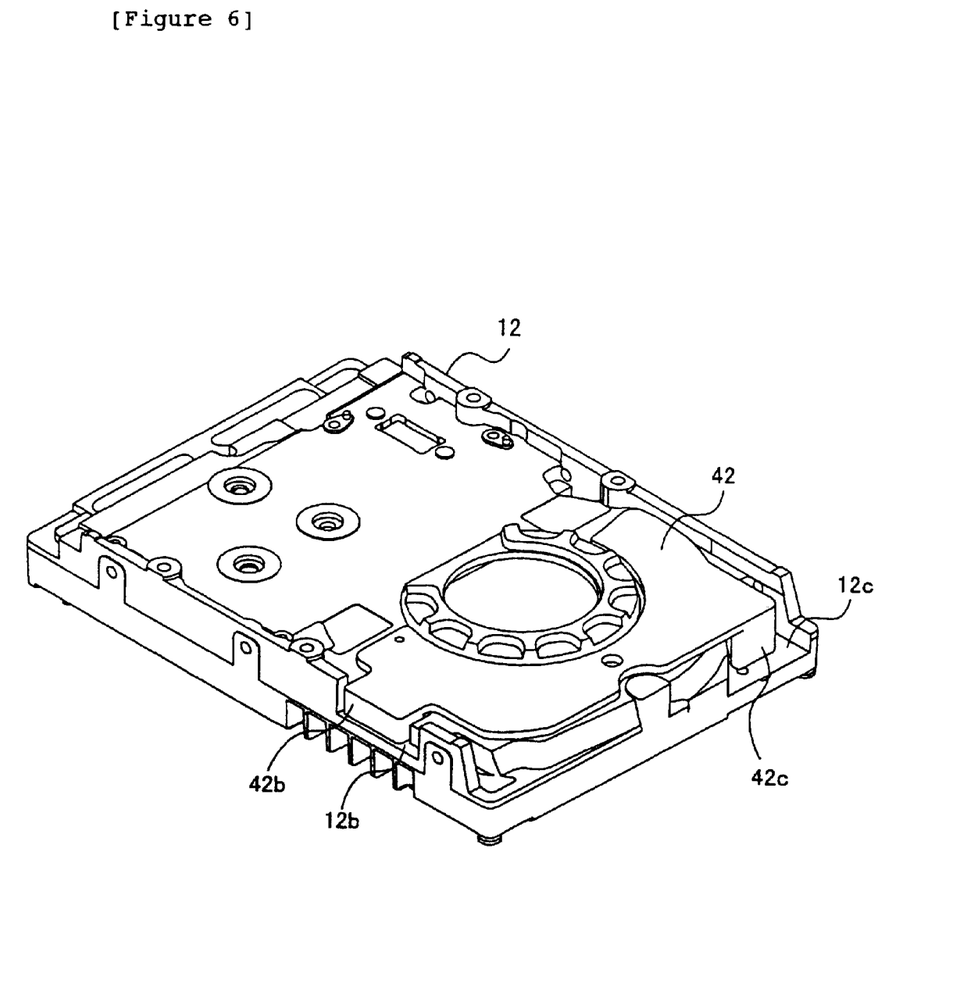
FIG. 6 is a perspective view of the damper attached to the base in the embodiment of the present invention.

FIG. 6 shows how the damper 42 is united to the base 12. The wall-thickness portion 42b of the damper 42 is fit in the recessed portion 12b and the wall-thickness portion 42 is fit in the recessed portion 12c with a predetermined gap from the base 12 respectively. The wall-thickness portions 42b and 42c are thus enabled to vibrate freely there within a predetermined range respectively. And, because it is apparent that the wall-thickness portions 42b and 42c are disposed at places across the rotation axis of the magnetic disk 22 and enabled to effectively repress the vibration of the HDD 10 to be caused by the rotation of the magnetic disk 22 as described above.

Figure 7:
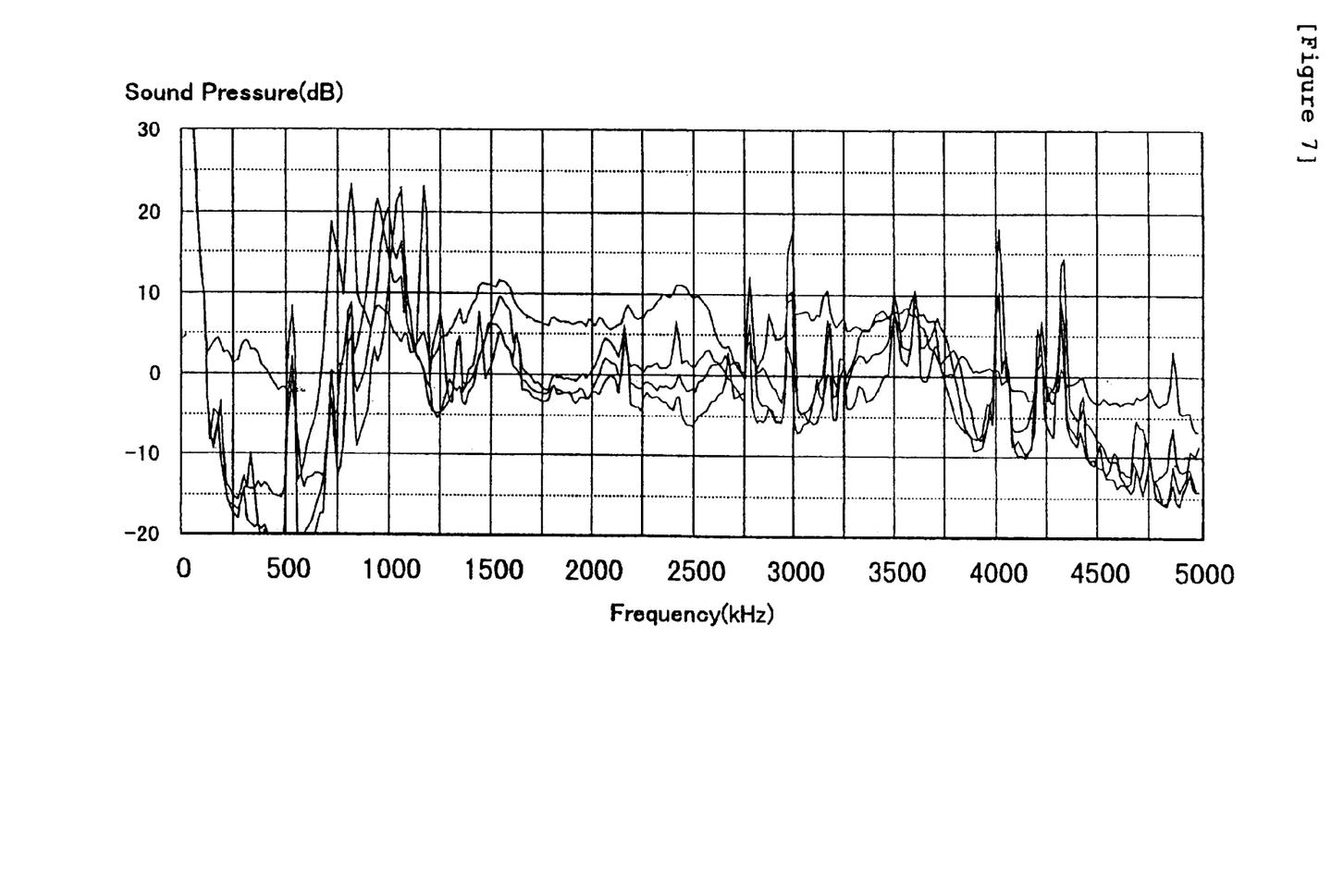
FIG. 7 is a plot of sound frequency properties of the HDD.

Next, a description will be made for the measurement of sound frequency properties of the HDD 10 of the present invention while the spindle motor 18 of the HDD 10 is driven rotationally. FIG. 7 shows the measurement results. The measurement data in FIG. 7 is obtained when the number of the magnetic disks 22 in the HDD 10 is one, then it is changed to two, three, and six. As shown in FIG. 7, the sound pressure reaches its peak in a frequency band within 700 to 1500 Hz. It will thus be understood that this band is the sound peak frequency band described above. And, in case the damper resonant frequency is in the frequency band of 700 to 1500 Hz as described above, the damper 42 is not effective so much to repress the vibration of the HDD 10. On the contrary, it amplifies the vibration of the HDD 10 sometimes.

The damper 42 has primary, secondary, and tertiary resonant frequencies, but it has been difficult for any of the conventional dampers 50 and 51 shown in FIG. 9 to shift all of those primary to tertiary resonant frequencies from the frequency band of 700 to 1500 Hz even when the material and thickness thereof are changed. More concretely, it has been impossible to shift the tertiary resonant frequency from the frequency band of around 1200 Hz.

Figure 8:
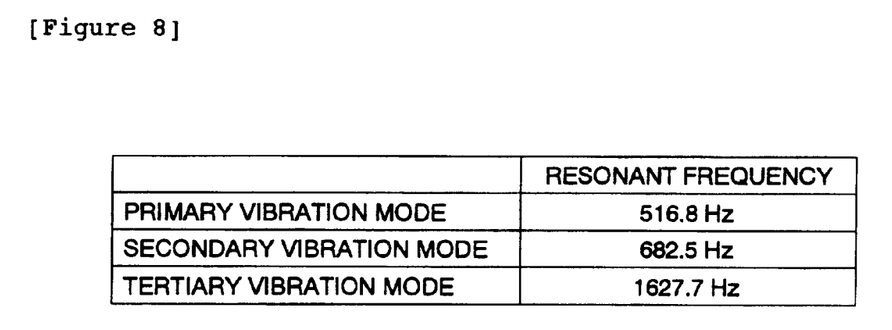
FIG. 8 shows measurement results of the resonant frequencies of the damper (obtained by the finite-element method) in the embodiment of the present invention.

The damper 42 in this embodiment, however, has the wall-thickness portions 42b and 42c that are different in thickness from the substrate 42a, so that their resonant frequencies can be adjusted freely, thereby all of the primary to tertiary resonant frequencies can be shifted from the frequency band of 700 to 1500 Hz. FIG. 8 is a table showing the concrete example. As shown in this table, the resonant frequencies of the damper 42 (obtained by a simulation with use of the finite-element method) are 516.8 Hz (primary), 682.5 Hz (secondary), and 1627.7 Hz (tertiary). The table also shows that those resonant frequencies are avoiding the sound peak frequency band of the HDD 10 successfully. It will thus be understood that the damper 42 can improve the sound properties of the HDD 10 effectively.

As described above, with the damper 42 of the present invention, the wall-thickness portions 42b and 42c can be adjusted properly, thereby setting a resonant frequency that avoids the sound peak frequency band of the HDD 10. Consequently, the present invention can give full play to the repressing function of the damper 42. And, in order to adjust this resonant frequency, it is effective to form such a portion as the through-hole 42e that reduces part of the rigidity of the damper 42.

Next, a description will be made for how the damper 42 in this embodiment is effective for the rotational vibration (R.V.). The R.V., as described above, means a vibration to occur in the HDD 10 as a reaction to the seek operation of the actuator 28.

In order to improve the properties of the HDD 10 so as to reduce this R.V., therefore, it is just required to increase the mass of the damper 42. And, this is why such the jointing means as screws or the like has been used to joint different members to the base 12 separately.

The damper 42 in this embodiment is provided with wall-thickness portions 42b and 42c so as to increase its mass. Consequently, the damper 42 can reduce the R.V. effectively. And, because the wall-thickness portions 42b and 42c are enabled to vibrate freely in the corresponding recessed portions 12b and 12c, they can function as so-called mass dampers for improving the properties of the HDD 10 to reduce the R.V. In addition, the wall-thickness portions 42b and 42c that function as mass dampers are disposed at outer periphery areas of the base 12, so they can improve the properties of the HDD 10 to reduce the R.V. more effectively. And, because the wall-thickness portions 42b and 42c are disposed in the circumferential direction of a circle around the pivot 32 of the actuator 28, they give the HDD 10 a large moment respectively, which functions as a resistance to the R.V.

As described above, the damper 42 in this embodiment is effective not only for improving the sound properties of the HDD 10, but also for reducing the R.V. in the HDD 10. The technical value of the damper 42 is such high. Especially, the damper 42, even when it is provided as a single damper, can obtain such the two technical effects. The damper 42 is therefore more excellent in the aspect of the manufacturing cost more than the conventional dampers.

Sometimes, many hard disk drives (HDD) 10 are crowded in a server. In such a server, adjacent hard disk drives (HDD) 10 affect each other by their sounds or vibrations. And, in order to avoid such a problem, more severe sound or vibration properties are required from each of those hard disk drives (HDD) 10 than when only a single hard disk drive (HDD) 10 is used. The HDD 10 in this embodiment is configured so as to meet such the severe requirement of sound or vibration properties.

The damper 42 as described above, because the wall-thickness portions 42b and 42c are disposed at outer periphery areas of the base 12, disposes them at outer periphery areas thereof. Especially, when the wall-thickness portions 42b and 42c are taken as mass dampers so as to reduce the R.V., the wall-thickness portions 42b and 42c should preferably be disposed at the outer periphery of the base 12. However, the wall-thickness portions 42b and 42c are not necessarily disposed at such the place; the present invention enables those wall-thickness portions 42b and 42c to be disposed at any place of the damper 42. Of course, in case those wall-thickness portions 42b and 42c are to be stuck on the HDD 10, the spaces for forming the recessed portions 12b and 12c at the base 12 are limited, because various other parts are also disposed on the base 12. Consequently, such the point should be taken into consideration when deciding the places for disposing the wall-thickness portions 42b and 42c. In addition, the thickness of the wall-thickness portions 42b and 42c can be increased continuously with respect to the substrate 42a. Furthermore, the flat damper 50 shown in FIG. 9 can be stuck on the damper 42 so as to increase the effect for repressing the vibration of the HDD 10. Furthermore, while it is premised that the damper 42 described above is disposed on the base 12, it may also be disposed at the cover 14 side in case it satisfies the requirement of the damper function.

The present invention has several advantages. As described above, the present invention can provide a damper that makes it easy to shift its resonant frequency from the sound peak frequency band of the subject HDD. The present invention can also provide a damper that improves the HDD properties so as to reduce the R.V.

While the invention has been shown or described in only some of its forms, it should be apparent to those skilled in the art that it is not so limited, but is susceptible to various changes without departing from the scope of the invention.

What is claimed is:

1. A damper attached to a disk drive apparatus and enabled to repress vibration, comprising:
    a flat portion having a jointing surface adapted to engage the disk drive apparatus;
    a mass-increased portion disposed in an outer periphery area of the flat portion that is greater than the flat portion in mass per unit area; and wherein
    the mass-increased portion is formed from a material having a specific gravity that is greater than that of any other portions of the damper.

2. The damper of claim 1 wherein the mass-increased portion has a wall-thickness portion that is thicker than the flat portion.

3. A disk drive apparatus, comprising:
    a disk medium driven rotationally round a rotation axis and enabled to store data;
    an actuator having a head for reading/writing data from/on the disk medium and movable relative to the disk medium;
    a housing for the disk medium and the actuator;
    a damper attached to an outer surface of the housing and having a thin portion and a plurality of thick portions; and the damper being formed from a material having a specific gravity that is greater than that of the housing.

4. The disk drive apparatus of claim 3 wherein the damper has a wall-thickness portion formed at an outer periphery area thereof and a flat portion other than the wall-thickness portion.

5. The disk drive apparatus of claim 4 wherein the flat portion is on the housing and the wall-thickness portion is free of contact with the housing.

6. The disk drive apparatus of claim 3 wherein the wall-thickness portion is circumferentially formed at a plurality of locations around the actuator.

7. The disk drive apparatus of claim 3 wherein the damper is mounted to the housing with an adhesive agent therebetween.

8. A hard disk drive, comprising:
a disk medium for storing data magnetically;
a spindle motor for driving the disk medium rotationally;
a rotary actuator having a head for storing/reproducing data on/from the disk medium and enabled to seek the head to the disk medium and rotate round a pivot;
a disk enclosure for enclosing the disk medium, the spindle motor, and the rotary actuator, the disk enclosure having a box-like base with an opening and a cover for sealing the opening;
a damper at a bottom of the base and having a wall-thickness portion formed at an outer periphery area of the base; and wherein
the base forms a housing space for housing the wall-thickness portion of the damper at an outer periphery portion that is free of the disk medium; and
the wall-thickness portion of the damper is housed in the housing space so as to be enabled to vibrate.

9. The hard disk drive of claim 8 wherein a resonant frequency of the damper is free inclusion in a sound peak frequency band generated by the rotation of the spindle motor.

10. A hard disk drive, comprising:
a disk medium for storing data magnetically;
a spindle motor for driving the disk medium rotationally;
a rotary actuator having a head for storing/reproducing data on/from the disk medium and enabled to seek the head to the disk medium and rotate around a pivot;
a disk enclosure for enclosing the disk medium, the spindle motor, and the rotary actuator, the disk enclosure having a box-like base with an opening and a cover for sealing the opening;
a damper at a bottom of the base and having a wall-thickness portion formed at an outer periphery area of the base; and wherein
the damper is formed from a material having a specific gravity that is greater than that of the base.

11. A hard disk drive, comprising:
a disk medium for storing data magnetically;
a spindle motor for driving the disk medium rotationally;
a rotary actuator having a head for storing/reproducing data on/from the disk-like medium and enabled to seek the head to the disk medium and rotate around a pivot;
a disk enclosure for enclosing the disk medium, the spindle motor, and the rotary actuator, the disk enclosure being configured by a box-like base having an opening and a cover for sealing the opening;
a mass damper disposed with a predetermined gap from the base; and
the mass damper being formed from a material having a specific gravity that is greater than that of the disk enclosure.

* * * * *